US008218178B2

(12) United States Patent
Ebitani

(10) Patent No.: US 8,218,178 B2
(45) Date of Patent: Jul. 10, 2012

(54) IMAGE PROCESSING APPARATUS, IMAGE PROCESSING METHOD, RECORDING MEDIUM STORING IMAGE PROCESSING PROGRAM, AND COMPUTER DATA SIGNAL EMBEDDED IN CARRIER WAVE

(75) Inventor: Kenji Ebitani, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 804 days.

(21) Appl. No.: 12/234,120

(22) Filed: Sep. 19, 2008

(65) Prior Publication Data
US 2009/0185235 A1 Jul. 23, 2009

(30) Foreign Application Priority Data

Jan. 17, 2008 (JP) ................................. 2008-008155

(51) Int. Cl.
G06F 15/00 (2006.01)
(52) U.S. Cl. ...................................... 358/1.15; 382/135
(58) Field of Classification Search .................. None
See application file for complete search history.

(56) References Cited

U.S. PATENT DOCUMENTS

| 5,510,896 A * | 4/1996 | Wafler | 358/296 |
| 2006/0280353 A1* | 12/2006 | Yi | 382/135 |
| 2006/0290968 A1* | 12/2006 | Itoh | 358/1.14 |
| 2007/0206228 A1* | 9/2007 | Miyagi | 358/3.21 |
| 2009/0059251 A1* | 3/2009 | Kondo et al. | 358/1.9 |

FOREIGN PATENT DOCUMENTS

| JP | A-64-15889 | 1/1989 |
| JP | A-2001-143076 | 5/2001 |
| JP | A-2002-92670 | 3/2002 |
| JP | A-2003-271973 | 9/2003 |
| JP | A-2004-72343 | 3/2004 |
| JP | A-2005-166023 | 6/2005 |
| JP | A-2005-262135 | 9/2005 |
| JP | A-2006-209286 | 8/2006 |
| JP | A-2006-235666 | 9/2006 |
| JP | A-2006-345530 | 12/2006 |
| JP | A-2007-122210 | 5/2007 |
| JP | A-2007-235226 | 9/2007 |
| JP | A-2007-306295 | 11/2007 |

OTHER PUBLICATIONS

Refusing Reason Notice mailed on Feb. 16, 2010 in corresponding Japanese Patent Application No. 2008-008155 (with translation).

* cited by examiner

Primary Examiner — Twyler Haskins
Assistant Examiner — Helen Q Zong
(74) Attorney, Agent, or Firm — Oliff & Berridge, PLC

(57) ABSTRACT

An image processing apparatus including: a determinant image management unit managing identification information in association with protecting information specifying processing allowance and a determinant image determining a spoofing; a reader reading an image containing the identification information in response to an action to process; an extraction unit extracting the identification information from the image; an acquisition unit acquiring the protecting information and the determinant image; a first determination unit determining allowance of the processing based on the protecting information; a second determination unit determining spoofing based on differential information between the determinant image and the read image; a third determination unit determining processing allowance of the read image based on results of determination by the first and second determination unit; and an image processor performing image processing according to the action to process the read image if the third determination unit determines that the processing is allowable.

9 Claims, 7 Drawing Sheets

IMAGE PROCESSING APPARATUS, IMAGE PROCESSING METHOD, RECORDING MEDIUM STORING IMAGE PROCESSING PROGRAM, AND COMPUTER DATA SIGNAL EMBEDDED IN CARRIER WAVE

CROSS-REFERENCE TO RELATED APPLICATIONS

This application is based on and claims priority under 35 USC 119 from Japanese Patent Application No. 2008-8155 filed Jan. 17, 2008.

BACKGROUND

1. Technical Field

The present invention relates to an image processing apparatus, an image processing method, a recording medium storing an image processing program, and a computer data signal embedded in a carrier wave.

2. Related Art

Along with recent spread of information equipment and development of networking, more and more network systems having image processing apparatuses such as facsimiles, printers, copy machines incorporated therein have been introduced into offices.

Documents for use in business are output in a variety of forms with the use of facsimiles, printers, copy machines or the like. On the other hand, a variety of countermeasures against fraudulent copying and leakage of confidential information have also been proposed.

One of such countermeasures has been proposed in which, when outputting confidential information onto paper, symbol or code information (partial or overall) is appended to the confidential information or the paper, and when the printed paper thus obtained is to be processed by an image processing apparatus, the symbol or code information appended to the printed paper is read so that processing of the printed paper is controlled depending on information indicated by the read symbol or code information.

Specifically, control is performed such that the printed paper for which an instruction is given is processed according to information indicated by the symbol or code information appended to the printed paper. For example, if the symbol or code information appended to the printed paper indicates prohibition of duplication and yet an instruction is given to copy the printed paper, the copying operation of the printed paper is disabled.

Further, a method has recently been proposed to append symbol or code information (partial or overall) to a printed matter to make it possible to check whether the printed matter has been disposed properly.

SUMMARY

According to an aspect of the invention, there is provided An image processing apparatus comprising: a determinant image management unit that manages identification information assigned to a paper document in association with protecting information specifying whether or not an action to process the paper document is allowable and a determinant image for determining whether or not the paper document is spoofed; a reader that reads an image of the paper document containing the identification information in response to the action to process the paper document assigned with the identification information; an extraction unit that extracts the identification information from the image of the paper document read by the reader; an acquisition unit that acquires from the determinant image management unit the protecting information and the determinant image corresponding to the identification information extracted by the extraction unit; a first determination unit that determines whether or not the action to process the paper document is allowable based on the protecting information acquired by the acquisition unit; a second determination unit that determines whether or not the paper document is spoofed based on differential information between the determinant image acquired by the acquisition unit and the image of the paper document read by the reader; a third determination unit that determines whether or not the processing of the image read from the paper document is allowable based on a result of determination by the first determination unit and a result of determination by the second determination unit; and an image processor that performs image processing according to the action to process the image read from the paper document by the reader if the third determination unit determines that the processing is allowable.

BRIEF DESCRIPTION OF THE DRAWINGS

An exemplary embodiment of the present invention will be described in detail based on the following figures, wherein.

DETAILED DESCRIPTION

A preferred embodiment of an image processing apparatus, an image processing method, a recording medium storing an image processing program, and a computer data signal embedded in a carrier wave according to the present invention will be described with reference to the accompanying drawings.

Figure 1:
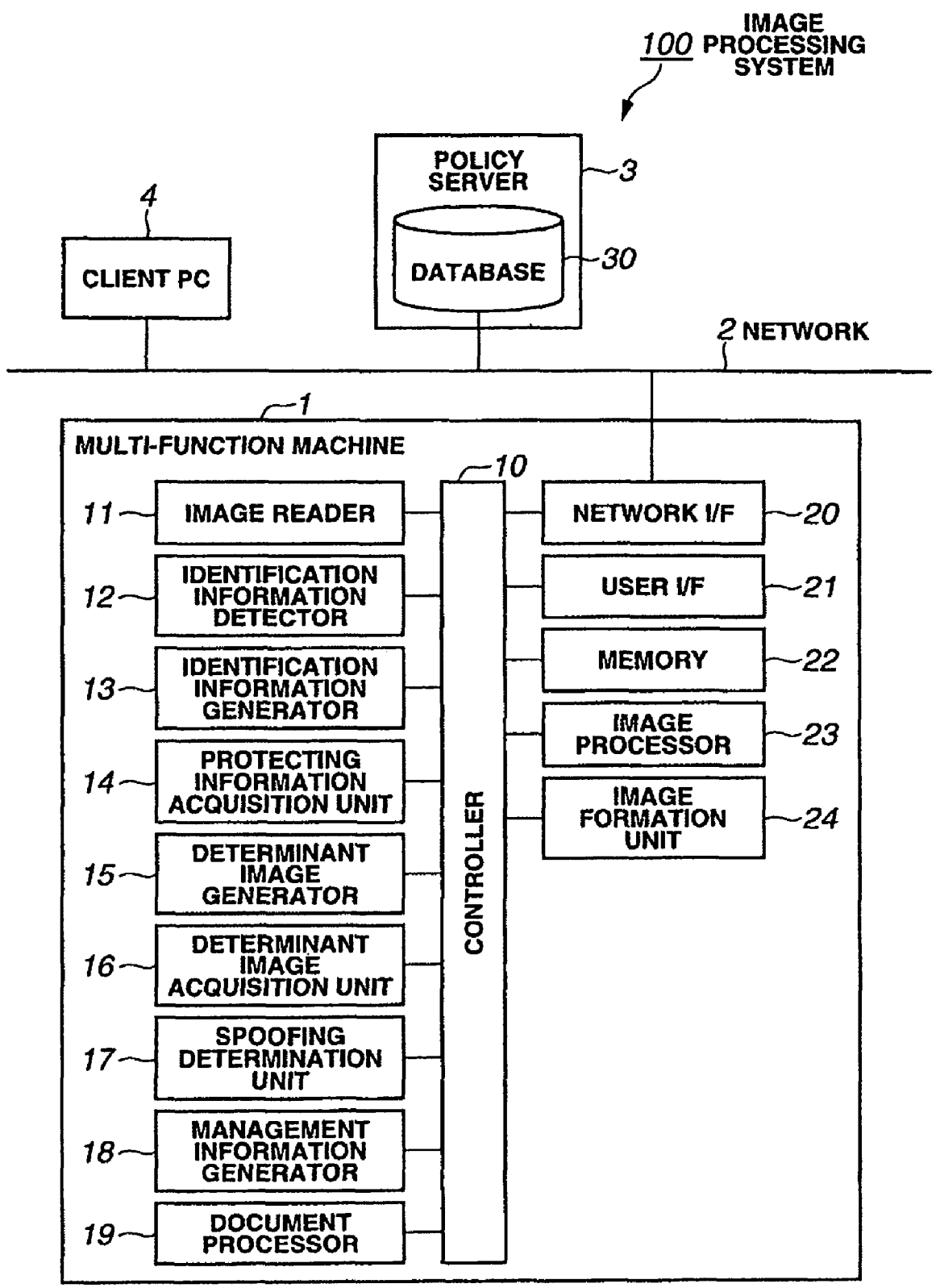
FIG. 1 is a block diagram showing a principal configuration of an image processing system 100 according to the present invention.

FIG. 1 is a block diagram showing a principal configuration of an image processing system 100 according to the present invention.

As shown in FIG. 1, in the image processing system 100, a multi-function machine 1 that is an image processing apparatus according to the present invention, a policy server 3, and a client PC 4 are connected to each other via a network 2 such as a LAN (local area network). The policy server 3 and the client PC 4 are typical computers composed of an input device (e.g. a keyboard or a mouse), an output device (e.g. a display), a central processing device (e.g. a CPU), a storage device (e.g. a ROM, a RAM, a hard disk, or an external storage device), and so on.

CPU stands for central processing unit, ROM stands for read only memory, and RAM stands for random access memory.

The image processing system 100 is connected not only the devices mentioned in the above but also to various devices including a server for managing the devices connected to the network 2. Devices such as the client PC 4 and the multi-function machine 1 may be connected in a plurality to the network 2.

The multi-function machine 1 has a scan function to optically scan a paper document (document printed on paper) to read image data of the paper document and to transmit the read image data to a designated destination. In addition to the scan function, the multi-function machine 1 has a print function to print printing data, a duplicate function to duplicate the paper document and a facsimile communication function to perform facsimile communication of paper documents or electronic documents.

Further, the multi-function machine 1 is provided with a discarding device such as a shredder (not shown) for discarding (shredding) a paper document. The multi-function machine 1 has a control function to determine whether the discarding processing by the discarding device is allowable or not based on image data read from the paper document by an image acquisition unit provided in the discarding device in response to a discarding instruction given to the discarding device, and to determine whether the discarding processing by the discarding device is allowable or not based on a result of determination whether or not the paper document is spoofed.

Although the description of this embodiment is made on the assumption that a paper document is a document prepared by forming an image or print data on paper, the paper document is not limited to the one formed on paper, but may be prepared by forming an image or print data on various other media such as a plastic sheet or a vinyl sheet.

The client PC 4 has a function to perform various types of document processing including displaying, editing, and printing a document. When printing a document, the client PC 4 has a function to add, to document data, identification information unique to each paper document (hereafter, referred to as the "document ID") and identification information for each page of the paper document (hereafter, referred to as the "page ID"), in an arrangement of a predetermined dot pattern (hereafter, referred to as the "code image") in order to enable identification of the paper document on which the document data is printed.

The policy server 3 is a server managing information for preventing fraudulent manipulation of a document and protecting the document (hereafter, referred to as the "protecting information") and various types of information including documents to be protected.

More specifically, for the purpose of preventing a protected document from being manipulated (viewed, duplicated, printed, scanned, or the like) by anyone other than those allowed to do so or preventing a protected document from being forged and spoofed, the policy server 3 manages management information associating the document ID and page ID assigned to a document to be protected (hereafter, referred to as the "protected document"), determinant image information for determining whether or not the protected document is spoofed, and protecting information for protecting the protected document (e.g. information indicating whether processing of the document is allowed or not and attribute information of operators allowed to manipulate the document), so that when any of the devices (multi-function machine 1, client PC 4, discarding device and so on) is operated, the policy server 3 responds to an inquiry about management information for a document to be manipulated by the operation.

The management information for the protected document is recorded and managed in a protected document management table 31 (see FIG. 2) of a database 30 established in the policy server 3. The protected document management table 31 will be described later.

Although the description of this embodiment is made in terms of an example in which the management information for the protected document is managed by the policy server 3, the present invention is not limited to this. The management information may be managed by the multi-function machine 1, the client PC 4, or any other device connected to the network 2.

The multi-function machine 1 is composed of functional blocks, including a controller 10, an image reader 11, an identification information detector 12, an identification information generator 13, a protecting information acquisition unit 14, a determinant image generator 15, a determinant image acquisition unit 16, a spoofing determination unit 17, a management information generator 18, a document processor 19, a network interface (hereafter, referred to as the "network I/F") 20, a user interface (hereafter, referred to as the "user I/F") 21, a memory 22, an image processor 23, and an image formation unit 24.

The controller 10, which is a CPU of the multi-function machine 1, controls the components of the multi-function machine 1 and the discarding device for integrated control of the multi-function machine 1 as a whole.

The image reader 11 optically scans a paper document to read an image formed on the paper document.

Specifically, the image reader 11 has a scanner device which optically scans a paper document placed on an ADF (automatic document feeder) or a platen glass provided in the multi-function machine 1 to read an image formed on the paper document and stores the read image in the memory 22.

For the sake of convenience of description below, an image read from a paper document by the image reader 11 will be referred to as the "read image".

The identification information detector 12 detects from a protected document (electronic or paper document) information such as document ID and page ID assigned to the protected document.

Specifically, the identification information detector 12 analyzes the read image read from the protected document (paper document) for which some processing instruction is given, to extract the above-described code image contained in the read image and to detect information such as document ID and page ID indicated by the code image.

Further, the identification information detector 12 analyzes a protected document (electronic document) for which some processing instruction is given, to detect information such as document ID and page ID of the electronic document.

The identification information generator 13 generates document IDs and page IDs for determinant images and protected documents newly generated by the multi-function machine 1.

The protecting information acquisition unit 14 acquires various types of information including protecting information in management information for a protected document (electronic or paper document).

Specifically, the protecting information acquisition unit 14 makes an inquiry to the policy server 3 to acquire various types of information including protecting information recorded in the management information in association with the document ID and page ID of a protected document (electronic or paper document).

When outputting an unprotected document as a protected document, the determinant image generator 15 generates a determinant image and stores the same in a predetermined storage area in the memory 22. The determinant image is generated by extracting an edge image from the image of the document and binarizing the edge image (converting into a black-and-white image).

Specifically, the determinant image generator 15 generates an image (determinant image) for determining whether a protected document (paper document) for which processing is instructed is spoofed or not, from an image of a document output as a protected document.

An edge image is used as a determinant image for determining whether or not a document is spoofed because, if the document's image is a multi-valued image, it is difficult to determine whether the document is spoofed or not. Specifically, when the electronically generated document's multi-valued image is compared with the document's multi-valued image obtained by scanning the printed image of the document after printing of the document's image a difference thus obtained is greater than the difference obtained by using the edge image even though the document is not spoofed, which makes the determination difficult.

When a protected document is a paper document, the term "proofed document" as used in the description of this embodiment means a fraudulent document that is forged from a legitimate protected document that is managed under the management information associated with the document ID and page ID of the document, for example by pasting a code image corresponding to the document ID and page ID of the protected document to a different paper document.

Before processing a protected document (paper document) for which processing is instructed, the determinant image acquisition unit 16 acquires from a predetermined storage location a determinant image of the protected document so that the determinant image is referred to for determining whether the protected document is spoofed or not.

Specifically, the determinant image acquisition unit 16 acquires the determinant image from information recorded in "Determinant image Storage Location" (see FIG. 2) of the management information for the protected document (paper document) by specifying a location (storage location) where the determinant image of the protected document is stored.

The spoofing determination unit 17 determines whether a protected document (paper document) for which processing is instructed is spoofed or not, based on a differential image between an image (determinant image) for the spoofing determination and an image to be determined that is a binarized edge image extracted from the protected document.

Specifically, the spoofing determination unit 17 generates a differential image from an image to be determined extracted from a protected document (paper document) for which processing is instructed and a determinant image of the protected document (paper document), and determines whether the protected document (paper document) is spoofed or not, by a method utilizing characteristics of a defective part of the generated differential image.

The method of determining whether or not a protected document (paper document) is spoofed is an essential feature of the present invention. Therefore, the method will be described later in more detail.

The management information generator 18 generates management information associating various types of information newly generated according to processing by the multi-function machine 1, including a determinant image, document ID and page ID for managing a protected document (paper or electronic document), a storage location of the determinant image of the document and protecting information for the document, and stores and manages the generated management information in a predetermined storage location.

The document processor 19 performs various types of processing on a protected document (paper or electronic document) for which processing such as duplicating, printing, or scanning is instructed, based on the protecting information for the protected document and a result of determination whether the document is spoofed or not.

The network I/F 20 connects to the network 2 or devices other than the multi-function machine 1 (hereafter, referred to as the "external devices") and controls exchange of a data signal or control signal between the multi-function machine 1 and the external devices connected thereto directly or via the network 2.

Further, the network I/F 20 transmits document data or a read image to a designated destination according to an instruction of the controller 10.

The user I/F 21 having a display such as an LCD (liquid crystal display) and an operation button performs various types of interface processing between the user and the multi-function machine 1 including input of instruction information to the multi-function machine 1 according to the user's operation, and display of various types of information including status information of the multi-function machine 1 from the multi-function machine 1 to the user.

The memory 22 formed by a storage device such as a ROM (read only memory), a RAM (random access memory), or a hard disk performs control of data writing to the storage device and data reading from the storage device.

The image processor 23 performs image processing of the read image or print data for which printing is instructed to convert the same into a predetermined image format according to scanning conditions set by the user such as resolution, number of colors, and coloration, and printing conditions such as layout printing (N-up), both-side or single-side printing, paper size, type of paper, and number of output copies.

Further, the image processor 23 generates a pattern image arranged in a predetermined dot pattern by converting information including the document ID and page ID of a protected document to be generated based on a preset conversion method, and generates an image by appending the pattern image thus generated to an electronic image to be processed.

When the multi-function machine 1 performs processing such as printing, duplicating, or scanning, the image formation unit 24 performs control for forming the image-processed image data (including read image) on paper (not shown) provided in the multi-function machine 1 and outputting the printed paper.

In the image processing system 100 having the configuration as described above, the multi-function machine 1 acquires, when a protected document is newly generated, determinant image for the protected document from an original source document (hereafter, referred to as the "source document") and manages the same as management information of the protected document so that it can be determined whether or not the generated protected document is spoofed. When the protected document is subjected to document processing, the multi-function machine 1 checks whether the protected document is spoofed or not based on characteristic information of a defective part of a differential image between the determinant image and an image to be determined of the protected document so that only a legitimate protected document is subjected to the document processing based on the protecting information of the protected document.

Processing operations relating to image processing and operations by the multi-function machine 1 according to the present invention will be described with reference to FIGS. 2 to 7.

Figure 2:
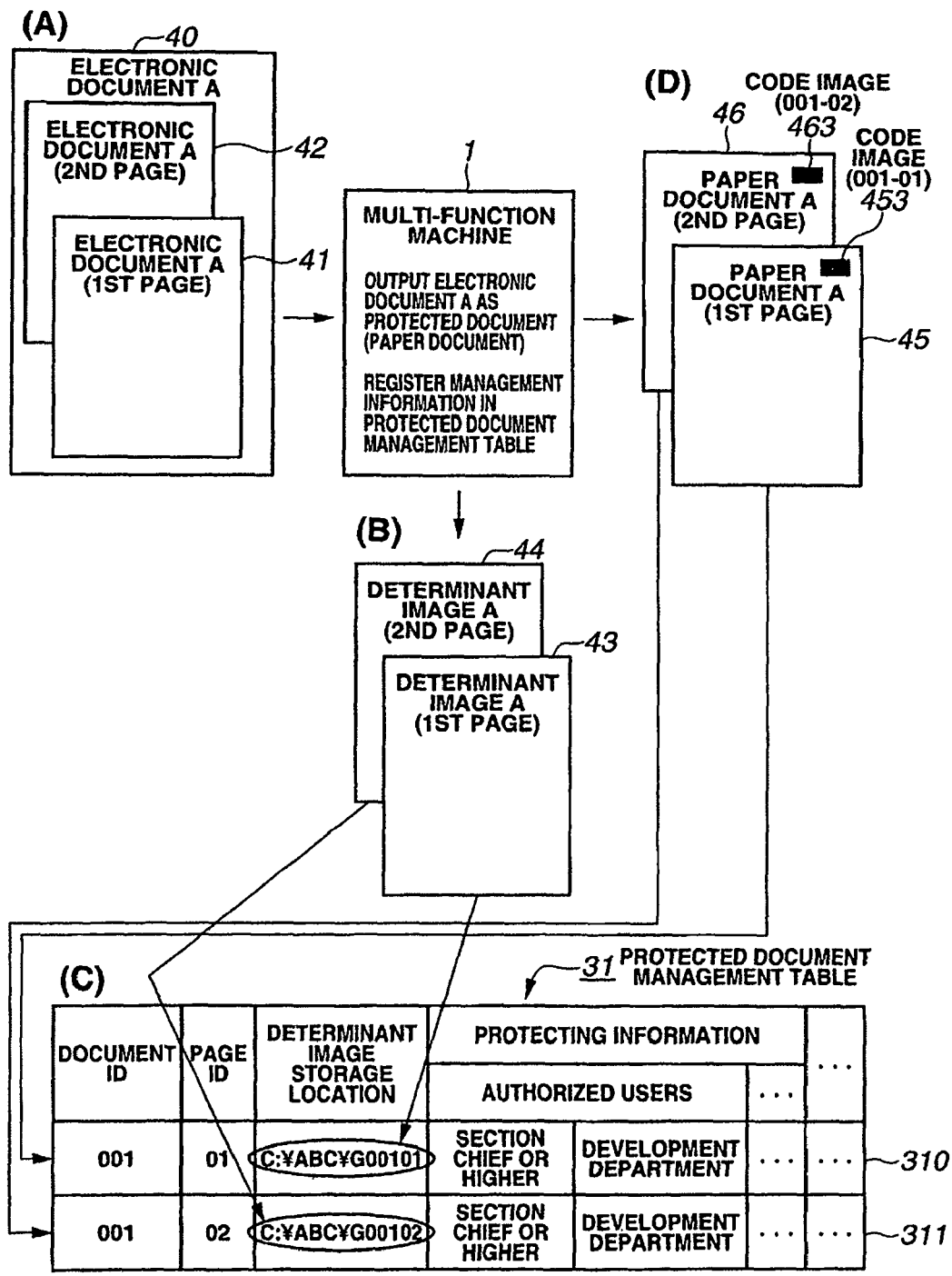
FIG. 2 is an explanatory diagram showing an example in which a protected document (paper document) is newly generated from an unprotected document.
Figure 3:
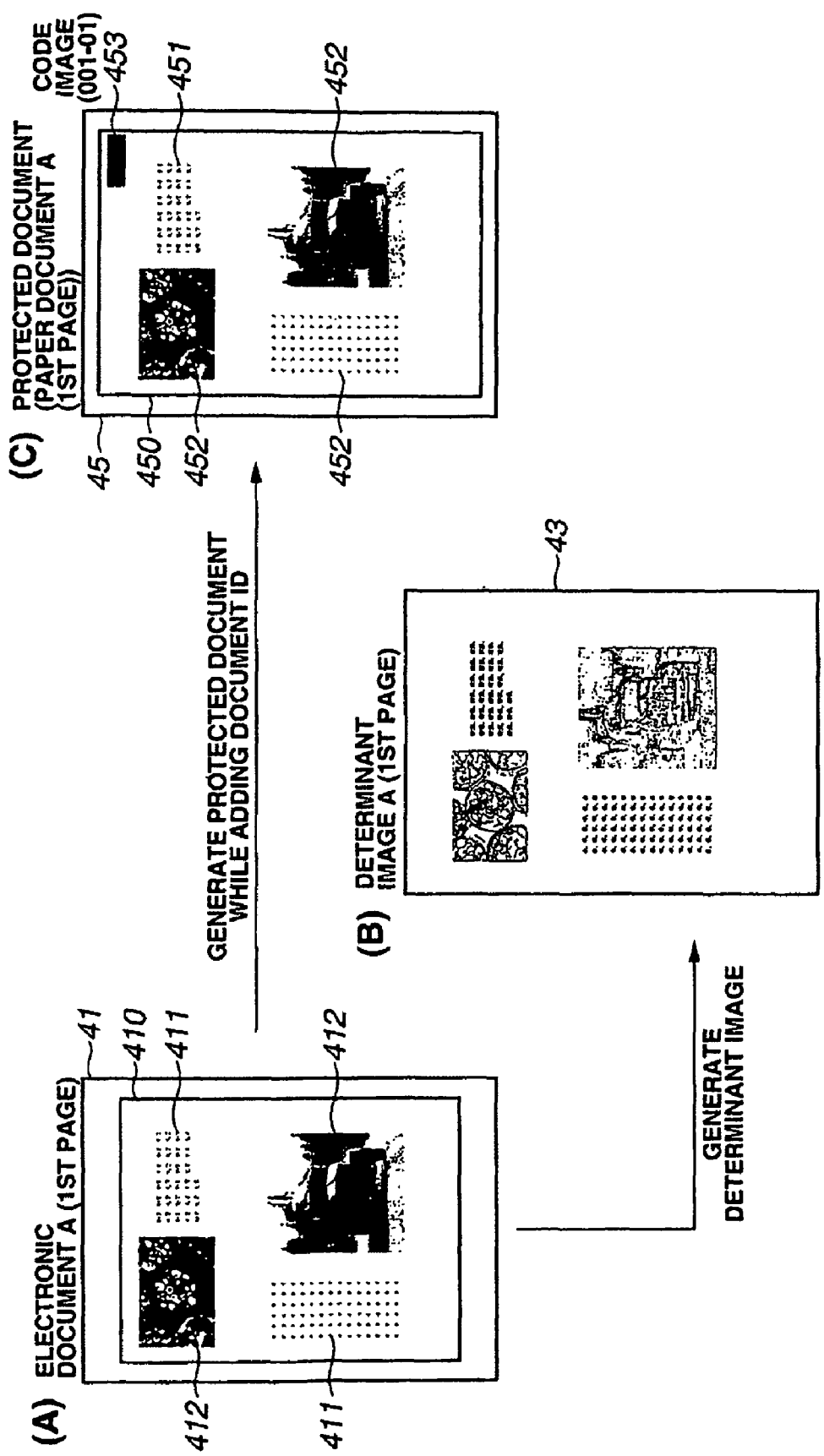
FIG. 3 is an explanatory diagram showing an example in which a protected document (paper document) is newly generated from an unprotected document.

FIG. 2 and FIG. 3 are explanatory diagrams showing an example in which a protected document (paper document) is newly generated from an unprotected document.

Part (A) of FIG. 2 and part (A) of FIG. 3 are diagrams showing an example of an unprotected document (electronic document). Part (B) of FIG. 2 and part (B) of FIG. 3 are diagrams showing an example of a determinant image extracted from the unprotected document (electronic document). Part (C) of FIG. 2 is a diagram showing an example of management information for generated protected documents and a protected document management table for storing and managing the management information. Part (D) of FIG. 2 and part (C) of FIG. 3 are diagrams showing an example of a protected document generated from the unprotected document (electronic document).

As shown in part (A) of FIG. 2 and part (A) of FIG. 3, when a print job of an electronic document A (consisting of two pages) 40 for which printing is instructed while specifying output as a protected document is input to the multi-function machine 1 by the client PC 4 or the like, the multi-function machine 1 extracts an edge portion from an image 410 of the first page 41 of the electronic document A 40 (hereafter, referred to as the electronic document A (1st page)") and binarizes the same (converts the same into a black-and-white image), so that an edge image (determinant image) 43 as shown in part (B) of FIG. 2 and part (B) of FIG. 3 is generated. Likewise, an edge image (determinant image) is generated from an image of the second page 42 of the electronic document A (hereafter, referred to as the "electronic document A (2nd page)"), in the same as the electronic document A (1st page) 41. The edge images thus generated from the 1st and 2nd pages are then stored in a predetermined storage location.

Although, as shown in part (A) of FIG. 3, the description of this embodiment is made in terms of an example in which the image 410 of the electronic document A (1st page) 41 is composed of a character portion 411 and a picture portion 412, the present invention is not particularly limited to this.

Once the determinant images (edge images) for the respective pages of the electronic document A 40 are stored, the multi-function machine 1 analyzes attribute information contained in the print job to acquire from the electronic document A 40 protecting information of the paper document A output as the protected document and generates document ID and page ID for each page of the paper document A.

In the case of a print job of the electronic document A 40 for which printing is instructed while specifying output as a protected document by the client PC 4 or the like, the print job contains, in addition to image data (data portion) of each page of the electronic document A 40, information for protecting a paper document A output as a protected document from the electronic document A 40 (protecting information), such as information to determine whether or not processing such as duplicating, printing, scanning and facsimile transmission of the paper document A is allowable, attribute information of operators allowed to perform such processing, limit to the number of times such processing is performed, and attribute information such as data length, printing conditions, and print instruction date. Therefore, the protecting information recorded in the attribute information is acquired as the protecting information for the paper document A.

After generating the document ID and page ID for each page of the paper document A, management information is generated for each page of the paper document A, associating the document ID and page ID thus generated with various information such as storage location of the determinant image corresponding to each page of the paper document A (hereafter, simply referred to as the storage location), and the protecting information corresponding to each page of the paper document A. The generated management information is transmitted to the policy server 3 to request registration thereof and the management information is registered in the protected document management table 31, as shown in part (C) of FIG. 2, of the database 30 established in the policy server 3.

As shown in Part (C) of FIG. 2, the protected document management table 31 is composed of items including "Document ID" and "Page ID" for recording document IDs and page IDs of protected documents, "Determinant image Storage Location" for recording storage location of the determinant images of the protected documents, and "Protecting Information" for recording protecting information of the protected documents, so that management information that is generated associating various information items such as document ID and page ID of each paper document A (protected document), storage location of the determinant image thereof, and protecting information is accumulated and stored in this protected document management table 31. Specifically, management information for the paper document A (1st page) 45 is generated as management information 310, and management information for the paper document A (2nd page) 46 is generated as management information 311, and these pieces of management information are registered in the protected document management table 31.

As seen from the management information 310 registered in the protected document management table 31, the document ID and page ID of the paper document A (1st page) 45 are "001" and "01", respectively. The determinant image 43 of the paper document A (1st page) 45 is stored at the storage location of "C:¥ABC¥G00101", and the paper document A (1st page) 45 is a protected document that is protected by the protecting information indicated by the items of "Authorized Users", "Section Chief or Higher" and "Development Department".

Further, it can be seen from the management information 311 that the document ID and page ID of the paper document A (2nd page) 46 are "001" and "02", respectively. The determinant image 44 of the paper document A (2nd page) 46 is stored at the storage location of "C:¥ABC¥G00102", and the paper document A (2nd page) 46 is a protected document protected by the protecting information indicated by the items of "Authorized Users", "Section Chief or Higher" and "Development Department".

The registration items of "Authorized Users", "Section Chief or Higher" and "Development Department" recorded in "Protecting Information" of the management information indicate that the users authorized to perform processing of the protected document corresponding to the document ID and page ID recorded in the management information are users who hold a position of section chief or higher or belong to the development department, in other words, that processing of the protected document is allowed to any user who holds a position of section or higher or belongs to the development department.

Once the management information 310 and management information 311 for the pages of the paper document A output as a protected document from the electronic document A 40 are registered in the protected document management table 31, as shown in part (D) of FIG. 2 and part (C) of FIG. 3, a code image is generated by converting the document ID and page ID of each page of the paper document A into a pattern image arranged in a predetermined dot pattern by a preset conversion method. The generated code image is synthesized and appended to the each page image of the electronic document A 40, and then the image thus obtained is formed on paper provided in the multi-function machine 1 to print out each page of the paper document A.

Specifically, as shown in part (C) of FIG. 3, the paper document A (1st page) 45 is output by forming the paper document A (1st page) 45 with the code image 453 of the paper document A (1st page) 45 appended to the image 410 of the electronic document A (1st page) 41. Like the electronic document A (1st page), the paper document A (2nd page) 46 is, as shown in part (D) of FIG. 2, output by forming the paper document A (2nd page) 46 with the code image 463 of the paper document A (2nd page) 46 appended to the image of the paper document A (2nd page) 46.

The processing operation by the multi-function machine 1 when a protected document (paper document) is newly generated from an unprotected document as illustrated in FIG. 2 and FIG. 3 will be described with reference to the flowchart of FIG. 4.

Figure 4:
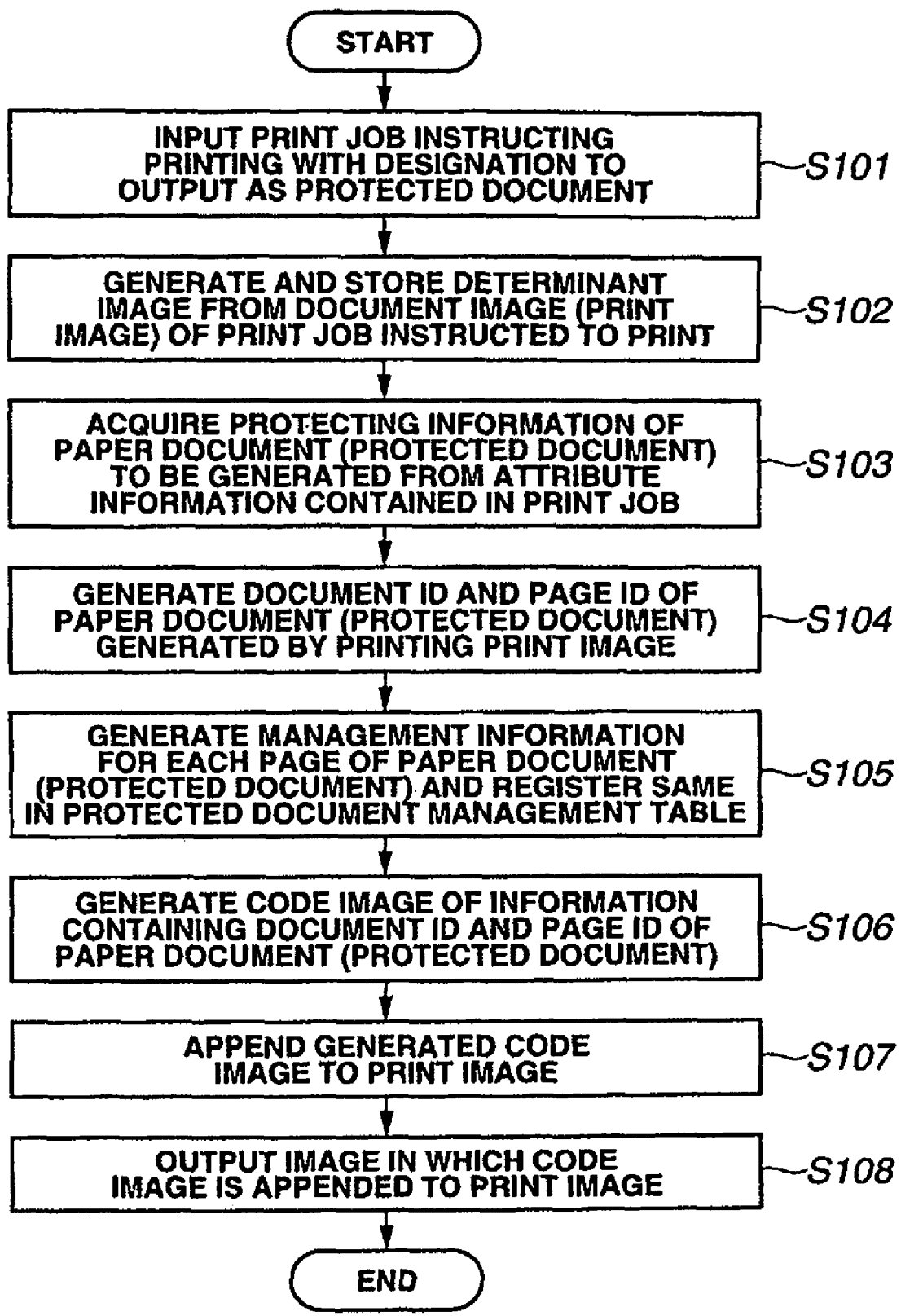
FIG. 4 is a flowchart showing processing steps when a protected document (paper document) is newly generated from an unprotected document.

As shown in FIG. 4, when the multi-function machine 1 receives a print job of an electronic document A (composed of two pages) 40 for which printing is instructed while specifying output as a protected document (step S101), the determinant image generator 15 of the multi-function machine 1 extracts an edge image of an edge portion from the image of each of the first and second pages of the electronic document A 40, binarizes the extracted edge image (converts the extracted edge image into a black-and-white image) to generate a determinant image (edge image) of each page, and stores the generated determinant image in a predetermined storage location (step S102).

Once the determinant image (edge image) of each page of the electronic document A 40 is stored, the protecting information acquisition unit 14 analyzes attribute information contained in the print job of the electronic document A 40 to acquire protecting information for the paper document A (1st page) 45 generated from the electronic document A (1st page) 41 and protecting information for the protecting information for the paper document A (2nd page) 46 generated from the electronic document A (2nd page) 42 (step S103). The identification information generator 13 then generates document ID and page ID for each of the paper document A (1st page) 45 and paper document A (2nd page) 46 (step S104).

Once the document ID and page ID is generated for each page of the paper document A, the management information generator 16 generates management information for each page of the paper document A, in which the document ID and page ID of each page of the paper document A, the storage location of the determinant image corresponding to each page of the paper document A, and protecting information corresponding to each page of the paper document A are associated with each other. The management information generator 16 then transmits the generated management information and a request for registration of the management information in the protected document management table 31 to the policy server 3 so that the management information is registered in the protected document management table 31 (step S105).

The policy server 3 records and registers the management information that is transmitted from the multi-function machine 1 together with a request for registration in the protected document management table 31, and thereafter notifies the multi-function machine 1 that the registration has been made.

After the registration of the management information of the paper document A, the image processor 23 generates a code image by converting the document ID and page ID of each page of the paper document A into a pattern image arranged in a predetermined dot pattern by a preset conversion method (step S106). The image processor 23 then generates an image in which the generated code image is synthesized and added to the image of each page of the electronic document A 40 (step S107), and the image formation unit 24 forms the generated image on paper provided in the multi-function machine 1 to output a paper document A (step S108).

Next, with reference to FIG. 5 and FIG. 6, description will be made of an example of various types of document processing performed on a protected document according to the present invention, based on a result of determination whether or not the protected document is spoofed and protecting information for the protected document.

Figure 5:
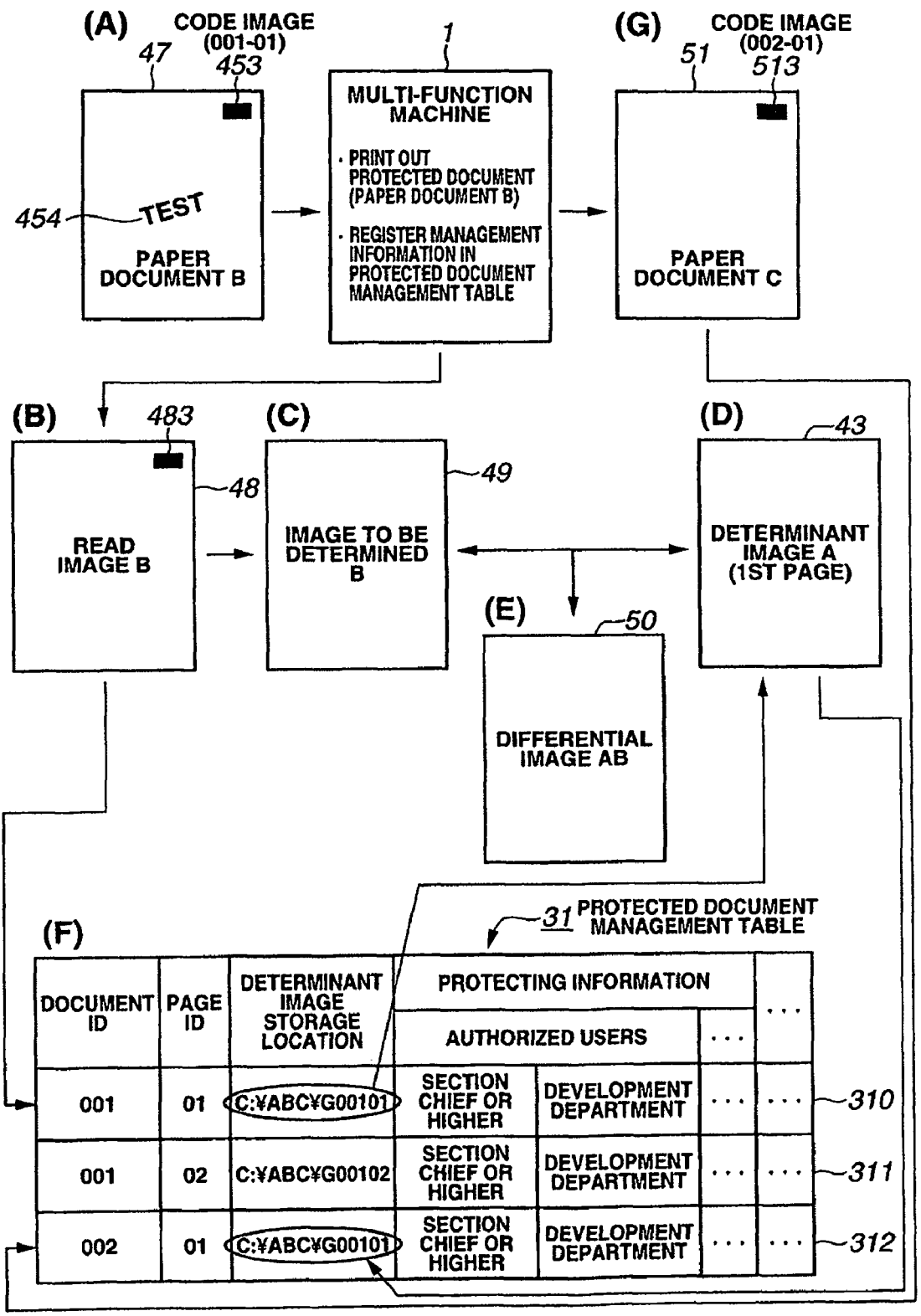
FIG. 5 is an explanatory diagram showing an example of document processing based on a result of spoofing determination for a protected document and protecting information for the protected document.
Figure 6:
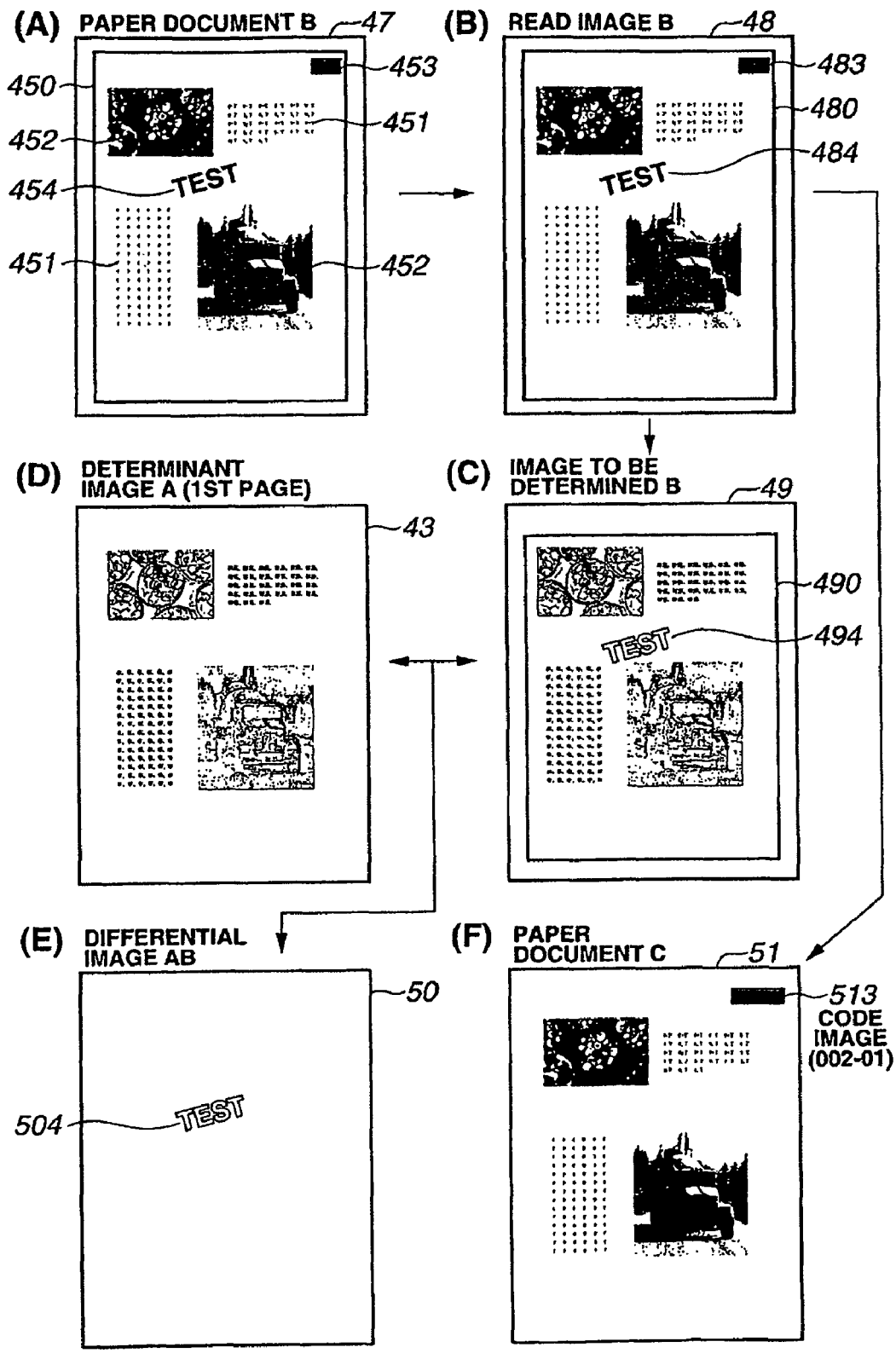
FIG. 6 is an explanatory diagram showing an example of document processing based on a result of spoofing determination for a protected document and protecting information for the protected document.

FIG. 5 and FIG. 6 are explanatory diagrams showing an example of document processing performed on a protected document based on a result of determination conducted before the document processing to determine whether or not the protected document is spoofed and the protecting information for the protected document.

The description of the document processing according to this embodiment below will be made in terms of an example in which a paper document B 47 having a comment or the like added to the above-described protected paper document A (1st page) 45 with the use of a writing tool such as a pen is to be duplicated, based on a result of determination whether or not the paper document B 47 is spoofed and protecting information for the paper document B 47.

When the paper document B 47 having hand-written characters of "TEST" 454 added by the user to the paper document A (1st page) 45 (see part (D) of FIG. 2 and part (C) of FIG. 3) as shown in part (A) of FIG. 5 and part (A) of FIG. 6, is set on the automatic document feeder or platen glass of the multi-function machine 1 and an instruction to duplicate the same is given by the user, the multi-function machine 1 optically scans the paper document B 47 to read an image as shown in part (B) of FIG. 5 and part (B) of FIG. 6 (hereafter, referred to as the "read image B") 48, and acquires protecting information for the paper document B 47 from a code image 483 contained in the read image B48.

The acquisition of the protecting information for the paper document B 47 is performed by a method in which the multi-function machine 1 analyzes the read image B 48 to extract the code image 483 contained in the read image B48, detects the document ID and page ID of the paper document B 47 from the extracted code image 483, acquires management information 310 associated with the detected document ID and page ID by making an inquiry to the policy server 3, and acquires information recorded in "Protecting Information" in the acquired management information 310 as protecting information for the paper document B 47.

On the other hand, upon receiving the inquiry from the multi-function machine 1 about the management information corresponding to the document ID and page ID, the policy server 3 identifies management information 310 associated with the document ID and page ID by referring to the protected document management table 31 (part (F) of FIG. 5) and notifies the multi-function machine 1 of the management information 310.

Since, in this example, the paper document B 47 is formed by adding a hand-written comment to the paper document A (1st page) 45 with the use of a writing tool such as a pen, the document ID and page ID of "001" and "01" are detected for the paper document B 47 by the multi-function machine 1 from the code image 483 contained in the read image B 48 of the paper document B 47. In response to the inquiry about the management information for the paper document B 47 made by the multi-function machine 1 based on the detected document ID and page ID, the policy server 3 refers to the protected document management table 31 as shown in part (F) of FIG. 5 to identify the management information 310 in which the information recorded in the fields of "Document ID" and "Page ID" coincide with the document ID and page ID of the paper document B 47 and sends the management information 310 as a response to the multifunction machine 1.

Upon acquiring the protecting information from the management information for the paper document B 47, the multi-function machine 1 determines whether or not the instructed processing (duplicate processing) is allowable with respect to the paper document B 47 based on the acquired protecting information 310, and further determines whether or not the paper document B 47 is spoofed only if the processing is allowable.

It should be understood that the sequence of the determination of whether the instructed processing (duplicate processing) is allowable and the determination of whether the paper document B 47 is spoofed is not limited particularly, and whichever can be done first.

If no code image 483 can be extracted from the paper document B 47, or there is no registered management information associated with the document ID and page ID detected from the code image 483 in the protected document management table 31, it is determined that the paper document B 47 is not a protected document, and the instructed processing (duplicate processing) on the paper document B 47 is disabled.

The instructed processing (duplicate processing) is disabled also when it is determined that the instructed processing of the paper document B 47 is not allowable based on the acquired protecting information for the paper document B 47.

The determination of whether the instructed processing (duplicate processing) is allowable or not is performed based on the protecting information for the paper document B 47 and attribute information such as position of a prospective operator that can be identified from user identification information input to the multi-function machine 1 by the operator when he/she instructs the processing.

The determination of whether the paper document B 47 is spoofed or not is performed as follows. As shown in part (F) of FIG. 5, the storage location of the determinant image A (1st page) 43 for determining whether or not the paper document B 47 is spoofed is identified from the information recorded in "Determinant image Storage Location" of the management information 310 for the paper document B 47 (the storage location is "C:¥ABC¥G00101" in this example). The determinant image (1st page) 43 as shown in part (D) of FIG. 5 and part (D) of FIG. 6 is acquired from the storage location thus identified. A differential image AB 50 (see part (E) of FIG. 5 and part (E) of FIG. 6) is generated, corresponding to a difference between the acquired determinant image (1st page) 43 and the edge image (image to be determined) B 49 as shown in part (C) of FIG. 5 and part (C) of FIG. 6 obtained by extracting an edge portion from the read image B48 of the paper document B 47 and binarizing the same (converting the same into a black-and-white image). The spoofing determination is performed by evaluating the number, distribution, proportion and the like of pixels in the defective part of the differential image AB 50.

As shown in part (C) of FIG. 6, the edge image (image to be determined) B 49 has an edge image 494 of a read image 484 corresponding to hand-written characters of "TEST" 454 added by the user in addition to the read image 480 corresponding to the image 450 of the paper document A (1st page) 45. Therefore, when the differential image 50 is generated from the image to be determined B49 and the determinant image (1st page) 43, the differential image 50 thus generated is of an edge image (TEST) 504 corresponding to the edge image (TEST) 494 (see parts (C) to (E) of FIG. 6).

The term "defective pixels of differential image" as used herein means pixels in a differential image when a differential image (the differential image AB 50) is generated from an image to be determined of a protected document (the image to be determined B 49 of the paper document B) and a determinant image (the determinant image (1st page) 43), and the determinant image is composed of black pixels and the image to be determined corresponding to those black pixels are of white pixels.

A reason for the use of such characteristics of defective pixels of a differential image is that there are many chances in offices that a hand-written comment or the like is added to a paper document, and hence it will be impossible to determine whether or not the document is spoofed, if the added part of the differential image is involved in the factors for the determination. Therefore, only the defective part of the differential image is used for the determination.

For instance, the edge image (TEST) 504 in the differential image 50 shown in part (E) of FIG. 6 is formed from hand-written characters added by the user, and hence indicates added pixels which are white pixels in the determinant image and black pixels in the image to be determined corresponding to the white pixels. Therefore, the edge image (TEST) 504 is not used for the spoofing determination.

For the spoofing determination based on a number of defective pixels in the differential image of a protected document, a method can be used for example in which a first threshold value is preliminarily set for the number of defective pixels in the differential image and it is determined that the protected document (paper document B 47) is spoofed if the number of the defective pixels in the differential image exceeds the first threshold value.

In this case, the first threshold value is set to a value corresponding to a number of pixels obtained by multiplying a number of black pixels in a determinant image by a first value (which can be set to any desired value).

If the first value is 0.1, the first threshold value is a number of pixels corresponding to 10% of a number of black pixels in a determinant image. Thus, it is determined that the protected document to be processed is spoofed if a number of defective pixels in a differential image exceeds 10% of the number of the black pixels in the determinant image.

The first threshold value can be set to any desired value, so that the criteria for spoofing determination of a protected document can be adjusted depending on a relevant device (multi-function machine, copy machine, printer, shredder, or the like).

Further, in addition to the first threshold value, a second threshold value obtained by multiplying a value corresponding to a number of black pixels of a determinant image by a second value (which can be set to any desired value) may be used, so that the determination is made depending on whether a number of the defective pixels in the differential image is within a predetermined range (whether it exceeds the first threshold value and does not exceed the second threshold value). The usage of such first and second threshold values makes it possible to make a decision such that the processing of the protected document is disabled if the number of defective pixels in the differential image of the protected document exceeds the second threshold value, but if the number of defective pixels exceeds the first threshold value but not the second threshold value, some other measure is taken without disabling the processing of the protected document for example, by notifying the manager or leaving the log.

As for a method of spoofing determination based on distribution and proportion of a defective part in the differential image of a protected document, a method can be used in which points are added according to a number of defective pixels in the differential image so that it is determined that the protected document is spoofed when the number of points exceeds a predetermined value.

In this case, as shown in part (A) of FIG. 6, different numbers of points per defective pixel may be added between a character portion 451 and a picture portion 452 of the image 450 formed in the paper document B 47.

Specifically, for example, two points may added for each defective pixel in the character portion 451 and one point may be added for each defective pixel in the picture portion 452.

Although the weighting is performed herein such that two points are added for the character portion 451 and one point is added for the picture portion 452, the weighting method is not limited to this. Further weighting may be performed for the character portion 451 depending on environments such as importance of character information used.

The number of points that is calculated from the number of the defective pixels in the differential image while weighting differently the respective defective parts (hereafter, referred to as the "number of defective points") is obtained by adding a value (calculated number of character portion points) obtained by multiplying the number of defective pixels in the character portion 451 of the differential image by its weighted number of points (hereafter referred to as the "weighted value (character portion)", that is two points in this case) and a value (calculated number of picture portion points) obtained by multiplying the number of defective pixels in the picture portion 452 by its weighted number of points (hereafter, referred to as the "weighted value (picture portion)", that is one point in this case).

Further, a threshold value is calculated as a value (hereafter, referred as the "number of points for determination") obtained by multiplying a value obtained by adding a value obtained by multiplying the number of black pixels in the character portion of the determinant image by the weighted value (character portion) and a value obtained by multiplying the number of black pixels in the picture portion by the weighting value (picture portion) by a third value that can be set to any desired value. It is determined that the protected document is spoofed if this threshold value is exceeded by the number of defective points of the differential image.

In this case, information indicating whether the black pixels indicating the edge portion are of the character portion or of the picture portion is generated and stored at the same time with the generation of the determinant image (edge image).

According to this spoofing determination method based on the distribution and proportion of the defective part in the differential image, the defective pixels in the character portion contribute more than in the above-described spoofing determination method based on the comparison between the number of defective pixels in the differential image and the threshold value. This means that even if the numbers of the defective pixels in the differential image are the same, results of the spoofing determination differ depending on the proportions of the defective pixels distributed in the character portion and the picture portion of the image of the protected document.

Even if there occurs a difference in the edge extracting performance between the character portion 451 and the picture portion 452 due to shading processing such as filtering performed during printing or image reading by the multi-function machine 1, the use of the spoofing determination method based on the distribution and proportion of the defective pixels in the differential image suppresses the effect of the shading processing to the defective pixels in the differential image by setting to different values the numbers of points per defective pixel between the character portion 451 and the picture portion 452.

Likewise, the effect can be suppressed for the portions of punctuation marks and small dots of Kanji, Hiragana and Katakana characters in the character portion 451 by setting to different values the numbers of points for each defective pixel in the differential images corresponding to those portions.

In this case, specifically, the number of points per defective pixel is set low for the portions of punctuation marks and small dots of the paper document B 47 in the defective pixels of the differential image AB 50.

The number of points is set lower for the picture portion than for the character portion, and the number of points is set lower for the portions of punctuation marks and small dots of Kanji, Hiragana and Katakana characters in the character portion than for the other portions, because proper edge extraction may be made impossible in these portions by the shading processing such as filtering as described above.

Further, when a differential image is generated from the determinant image of the protected document and the image to be determined, the image to be determined may be dilated and then the differential image may be generated from the dilated image to be determined and the determinant image.

In this case, the dilated image to be determined may possibly be wider than the determinant image. However, the image of the widened portion corresponds to an additional portion in the differential image generated from the image to be determined and the determinant image, and hence does not have any effect on the defective part of the differential image. Accordingly, it is unlikely to have a significant effect on the determination of whether the protected document is spoofed or not.

For example, when the character portion 451 of the image 450 formed in the paper document B 47 includes densely stroked Kanji characters or similar characters (e.g. "Q" and "O" in alphabets), there is a possibility that no defective pixel at all exists in such portion.

Specifically, for example, in the case in which the character portion 451 is composed only of the densely stroked Kanji characters or similar characters which are set to the same font size, the same line space, and the same number of characters per line, the number of defective pixels in such portion is possibly very small in comparison with the other portions. It is supposed, however, that the chance is generally very small that there exists a character portion 451 composed only of densely stroked Kanji characters or similar characters. Therefore, the dilated image to be determined does not have significant effect on the spoofing determination.

When a protected document to be printed is composed of a plurality of pages and the last page has only several lines, the number of pixels in the image to be determined (edge image) and the determinant image (edge image) of the last page of the protected document may be too small to ensure strict spoofing determination for the that protected document page. In this case, this problem can be solved by using a method in which attributes of an object are assigned to an edge group in the image to be determined when the image to be determined is generated from the protected document, so that the object is determined based on the edge image.

This method of determining the object based on the edge image may be implemented by using a technique disclosed in related art documents such as Japanese Patent Application Laid-Open No. S64-15889, Japanese Patent Application Laid-open No. 2001-143076, and Japanese Patent Application Laid-open No. 2003-271973. Further, the attributes of the object may be assigned to the image of the protected document, instead of the edge group in the edge image so that the object is determined based on this image.

In this case as well, the spoofing determination is performed with respect to the protected document based on a result of calculating the characteristics such as a quantity, distribution, and proportion of the defective pixels in the differential image between the image to be determined and the determinant image, in the same manner as described above.

Further, in this case, when the determinant image in the differential image is composed of black pixels and the attributes of the edge group containing those black pixels do not match the attributes of the edge group containing the pixels of the image to be determined corresponding to those black pixels, the pixels in the differential image are recognized as defective pixels.

Accordingly, if the attributes of the black pixels in the determinant image are characters while the attributes of the pixels in the image to be determined corresponding to those black pixels are a photo image, the pixels in the differential image are determined to be defective pixels.

The dilating processing thus applied to the image to be determined makes it possible to absorb the thinning or subtle misalignment of the edge of the edge image extracted from the read image which is caused depending on the printing performance or image reading performance of the multi-function machine 1.

Skew correction during image reading from the paper document B 47 may be performed by using a related art.

The instructed processing (duplicate processing) is performed only when it is determined that the paper document B 47 is not spoofed by the spoofing determination method utilizing the characteristics of the defective part of the differential image AB 50 generated from the image to be determined B 49 and the determinant image A (1st page) 43.

The instructed processing (duplicate processing) is performed as follows. Protecting information for a paper document C that is generated by duplicating the paper document B 47 and document ID and page ID of the paper document C are generated. Management information 312 as shown in part (F) of FIG. 5 is generated, in which the generated document ID and page ID of the paper document C are associated with the storage location of the determinant image 43 which is referred to when determining whether or not the paper document B 47 is spoofed, and the protecting information for the paper document C, and the management information 312 thus generated is registered in the protected document management table 31.

After the registration of the management information for the paper document C, as shown in part (G) of FIG. 5 and part (F) of FIG. 6, the document ID and page ID of the paper document C are converted by a preset conversion method into a pattern image arranged in a predetermined dot pattern to generate a code image. The code image thus generated is synthesized and appended to the image obtained by removing the code image 483 from the read image B 48, and then the paper document C is formed on paper provided in the multi-function machine 1 and output.

In the example shown in FIGS. 5 and 6, the paper document C is formed based on the determination that the document is not spoofed using any of the spoof determination methods described above based on the defective pixels in the differential image. The paper document C is not formed if the document is spoofed.

The document processing operation of the multi-function machine 1 based on a spoofing determination result on a protected document and protecting information for the protected document as shown in FIG. 5 and FIG. 6 will now be described with reference to the flowchart of FIG. 7.

Figure 7:
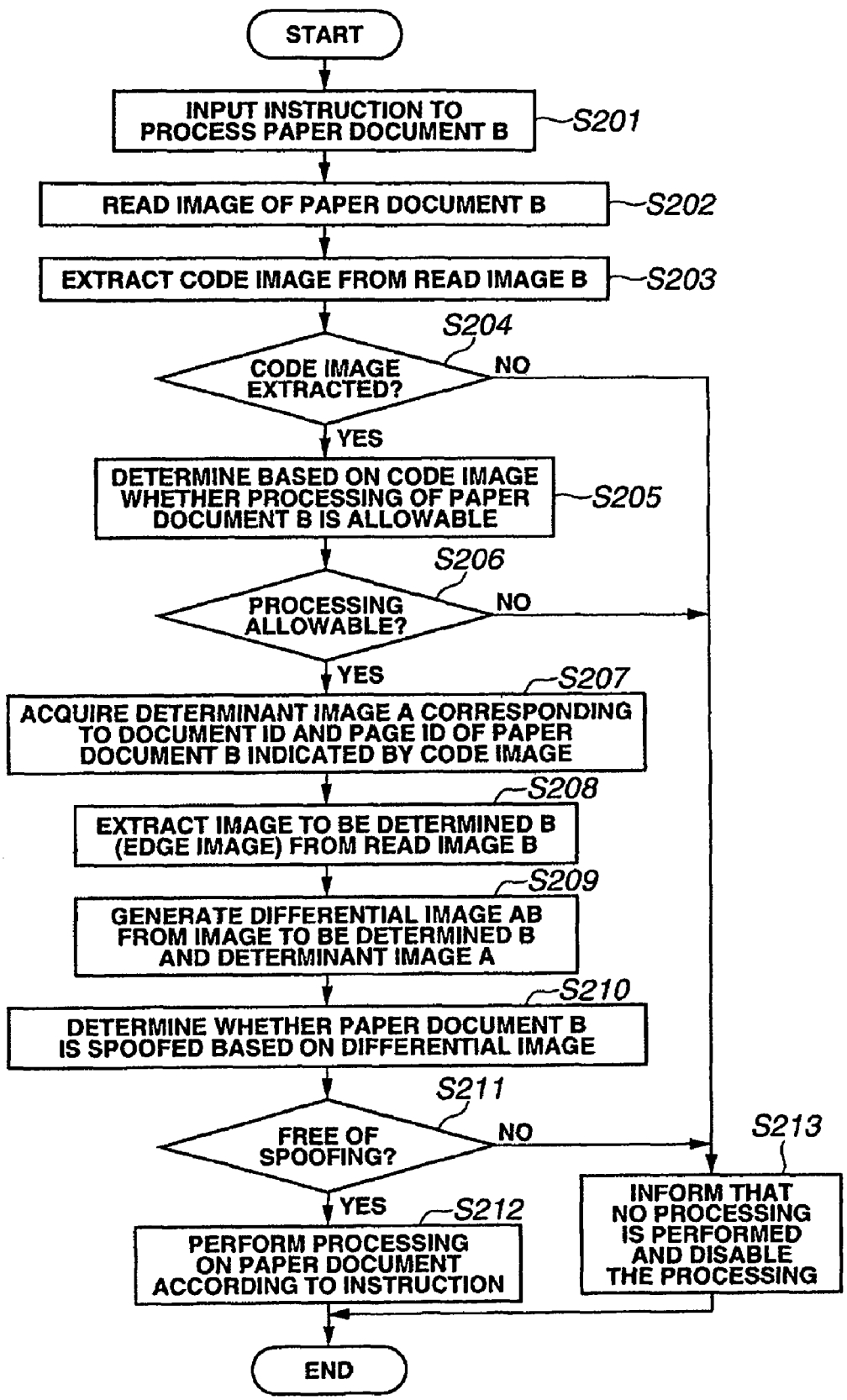
FIG. 7 is a flowchart showing document processing based on a result of spoofing determination for a protected document and protecting information for the protected document.

As shown in FIG. 7, a paper document B (protected document) is set on the automatic document feeder or platen glass of the multi-function machine 1, and duplicate processing is instructed (step S201). The image reader 11 of the multi-function machine 1 scans the paper document B to read the image formed on the paper document B and temporarily stores the read image (read image B) in the memory 22 (step S202).

The read image B read from the paper document B is subjected to image analysis by the identification information detector 12 whereby a code image contained in the read image B is extracted (step S203).

If no code image is extracted from the read image B in step S203 (NO in step S204), the identification information detector 12 notifies the controller 10 that no code image was extracted. The controller 10 then determines that the paper document B is an unprotected document and performs control to disable the instructed processing (duplicate processing) (step S213).

If a code image is extracted from the read image B of the paper document B in step S203, the identification information detector 12 identifies the document ID and page ID of the paper document B contained in the extracted code image. The protecting information acquisition unit 14 requests the policy server 3 for acquisition of management information for the paper document B associated with the document ID and page ID thus identified and acquires the same. Based on the protecting information recorded in the management information thus acquired, it is determined whether or not the instructed processing (duplicate processing) on the paper document B is allowable (step S205).

The code image has various types of information, including the document ID and page ID of the paper document B, formed in a two-dimensional dot pattern image according to a predetermined rule. Therefore, the various types of information such as the document ID and page ID corresponding to the code image can be identified by converting the dot pattern of the code image according to the predetermined rule.

The acquisition of the protecting information for the paper document B associated with the document ID and page ID is performed by the protecting information acquisition unit 14 which transmits the document ID and page ID together with a request for acquisition of management information to the policy server 3 via the controller 10 and the network I/F 19, and receives the management information corresponding to the document ID and page ID from the policy server 3.

Upon receiving the request for acquisition of the management information from the multi-function machine 1, the policy server 3 refers to the protecting information management table 31 to identify management information associated with the document ID and page ID transmitted by the multifunction machine 1, and transmits the identified management information to the multi-function machine 1 in response to the request.

If the identification information detector 12 determines, in step S205, that the instructed processing (duplicate processing) on the paper document B is not allowable, based on the protecting information for the paper document B recorded in the management information of the paper document B thus acquired (NO in step S206), the identification information detector 12 notifies the controller 10 that the paper document B is protected to prohibit the instructed processing. Based on the notified information, the controller 10 performs control to disable the instructed processing (duplicate processing) (step S213).

If the identification information detector 12 determines that the paper document B is protected such that the instructed processing (duplicate processing) on the paper document B is allowed, based on the protecting information for the paper document B (YES in step S206), the determinant image acquisition unit 16 acquires a determinant image for determining whether or not the paper document B is spoofed (step S207).

This determinant image is acquired by specifying the storage location of the determinant image of the paper document B 47, from the information recorded in the "Determinant image Storage Location" of the management information for the paper document B.

When the determinant image B for the paper document B is acquired in step S207, the spoofing determination unit 17 extracts an edge image (image to be determined) B by extracting an edge portion from the read image B of the paper document B and binarizing the same (converting the same into a black-and-white image) (step S208). The spoofing determination unit 17 then generates an image (differential image) AB corresponding to a difference between the extracted image to be determined (edge image) B and the determinant image B for the paper document B (step S209), and determines whether or not the paper document B is spoofed based on the characteristics of the generated differential image AB (step S210).

As described above, the spoofing determination of the paper document B is performed by a method using the characteristics of the defective part in the differential image such as the number, distribution and proportion of the defective pixels in the differential image AB between the determinant image B and the image to be determined B of the paper document B.

If the spoofing determination unit 17 determines, in step S210, that the paper document B is free of spoofing (YES in step S211), the instructed processing (duplicate processing) is performed on the paper document B (step S212).

The instructed processing (duplicate processing) on the paper document B is performed as follows. Document ID and page ID are generated for a paper document C. Management information is generated, associating various information such as the generated document ID and page ID of the paper document C, the storage location of the determinant image 43 which is referred to when the spoofing determination is made for the paper document B 47, and protecting information for the paper document C, and registered in the protected document management table 31. Then, the document ID and page ID of the paper document C are converted into a pattern image arranged in a predetermined dot pattern by a preset conversion method, whereby a code image is generated. The generated code image is synthesized and appended to a print image of the paper document C, and then the paper document C is output by forming the print image on paper provided in the multi-function machine 1.

If the spoofing determination unit 17 determines that the paper document B is not free of spoofing (NO in step S211), the controller 10 is notified thereof, and performs control to disable the instructed processing (duplicate processing) on the paper document B (step S213).

Next, description will be made of processing operation by the discarding device according to an action to discard a paper document, based on control by the multi-function machine 1.

When a paper document (protected document) is placed in a discarding device such as a shredder (not shown) of the multi-function machine 1 and discard processing (instructed processing) is instructed, an image reader (not shown) provided in the discarding device scans the paper document to read an image formed on the paper document. The read image is transmitted to the multi-function machine 1 and temporarily stored in the memory 22.

The read image read from the paper document is image-analyzed by the identification information detector 12 of the multi-function machine 1 so that a code image contained in the read image is extracted.

If no code image is extracted from the read image, the controller 10 of the multi-function machine 1 is notified thereof. According to an instruction of the controller 10, the discarding device stores the paper document in a document storage tray (not shown) provided in the discarding device without discarding the same.

If a code image is extracted from the read image of the paper document, the identification information detector 12 identifies the document ID and page ID of the paper document contained in the code image. The protecting information acquisition unit 14 requests the policy server 3 for acquisition of management information of the paper document associated with the identified document ID and page ID, and the identification information detector 12 determines, based on the protecting information recorded in the management information thus acquired, whether the instructed processing (discard processing) on the paper document is allowable or not.

If the identification information detector 12 determines, based on the protecting information for the paper document recorded in the acquired management information, that the instructed processing (discard processing) on the paper document is not allowable, the identification information detector 12 notifies the controller 10 that the paper document is protected so as to disable the instructed processing. The discarding device thus stores the paper document in the document storage tray (not shown) provided in the discarding device without discarding the same, according to an instruction of the controller 10.

If the identification information detector 12 determines, based on the protecting information for the paper document, that the paper document is protected so as to enable the instructed processing (discard processing), the determinant image acquisition unit 16 acquires, according to this determination result, an determinant image for determining whether or not the paper document B is spoofed.

The determinant image is acquired by specifying the storage location of the determinant image for the paper document, from information recorded in "Determinant image Storage Location" of the management information for the paper document.

Upon acquiring the determinant image of the paper document, the spoofing determination unit 17 extracts an edge image (image to be determined) by extracting an edge portion from the read image of the paper document and binarizing the same (converting the same into a black-and-white image), and generate an image (differential image) corresponding to the difference between the extracted image to be determined (edge image) and the determinant image of the paper document. The spoofing determination unit 17 then determines based on characteristics of the differential image thus generated whether or not the paper document is spoofed.

The spoofing determination of the paper document is performed, as described above, by a method using characteristics of the defective part of the differential image between the determinant image of the paper document and the image to be determined, such as the number, distribution and proportion of the defective pixels in the differential image.

If the spoofing determination unit 17 determined that the paper document is not spoofed, the controller 10 is notified thereof and the discarding device performs the instructed processing (discard processing) on the paper document according to an instruction from the controller 10.

The present invention may be embodied as an information processing system by causing the image processing system having a communication function to implement the operation as described above, or by installing, on a computer, a program for providing the means as described above in a recording medium such as CD-ROM or DVD-ROM and causing the computer to execute the program.

Further, the medium for providing the program may be a communication medium (such as a communication circuit or communication system which temporarily or volatilely holds the program). For example, the program may be posted on a communication network bulletin board (BBS, or Bulletin Board Service) and distributed through a communication circuit.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   a determinant image management unit that manages identification information assigned to a paper document in association with protecting information specifying whether or not an action to process the paper document is allowable and a first edge image composed of edge components of the image of an paper document;
   a reader that reads an image of the paper document containing the identification information in response to the action to process the paper document assigned with the identification information;
   an extraction unit that extracts the identification information from the image of the paper document read by the reader;
   an acquisition unit that acquires from the determinant image management unit the protecting information and the first edge image corresponding to the identification information extracted by the extraction unit;
   a first determination unit that determines whether or not the action to process the paper document is allowable based on the protecting information acquired by the acquisition unit;
   a second determination unit that calculates, based on a differential image between a second edge image composed of edge components of the image of the paper document read by the reader and the first edge image acquired by the acquisition unit, a number of pixels in a defective part of the second edge image relative to the first edge image, and determines whether or not the paper document is spoofed based on whether or not the calculated number of pixels exceeds a threshold value having been set previously in association with the action to process the paper document;
   a third determination unit that determines that a processing in response to the action to process the paper document is allowable when the first determination unit determines that the action to process the paper document is allowable and the second determination unit determines that the paper document is not spoofed; and
   a processor that performs a processing according to the action to process the image read from the paper document by the reader if the third determination unit determines that the processing is allowable.

2. The image processing apparatus according to claim 1, wherein:
   the determinant image management unit manages the first edge image composed of edge components of the determinant image identified by the identification information; and
   the second determination unit generates the second edge image composed of edge components of the image of the paper document read by the reader and calculates a difference between the generated second edge image and the first edge image of the determinant image acquired by the acquisition unit.

3. The image processing apparatus according to claim 2, wherein the second determination unit determines whether or not the paper document is spoofed based on any one of a quantity, distribution and proportion of negative components in differential information obtained by subtracting the first edge image of the determinant image from the second edge image of the image read from the paper document.

4. The image processing apparatus according to claim 1, comprising:
   a discard unit that discards a paper document;
   a storage unit that stores a paper document; and
   a storage controller that performs control to store the paper document in the storage unit without discarding the same,
   wherein:
   the reader reads image information from the paper document in response to an action to discard the paper document;
   the first or second or third determination unit determines whether or not the processing corresponding to the action to discard is allowable with respect to the image read by the reader; and
   the storage controller performs control to store the paper document in the storage unit, if the first or second or third determination unit determines that the action to discard is not allowable.

5. The image processing apparatus according to claim 2, comprising:
   a discard unit that discards a paper document;
   a storage unit that stores a paper document; and a storage controller that performs control to store the paper document in the storage unit without discarding the same, wherein:

the reader reads image information from the paper document in response to an action to discard the paper document;

the first or second or third determination unit determines whether or not the discard processing corresponding to the action is allowable with respect to the image read by the reader; and the storage controller performs control to store the paper document in the storage unit, if the first or second or third determination unit determines that the discard processing is not allowable.

6. The image processing apparatus according to claim 3, comprising:

a discard unit that discards a paper document;

a storage unit that stores a paper document; and a storage controller that performs control to store the paper document in the storage unit without discarding the same, wherein:

the reader reads image information from the paper document in response to an action to discard the paper document;

the first or second or third determination unit determines whether or not the processing corresponding to the action to discard is allowable with respect to the image read by the reader; and the storage controller performs control to store the paper document in the storage unit, if the first or second or third determination unit determines that the action to discard is not allowable.

7. An image processing method comprising:

managing protecting information prescribing whether an action to process a paper document is allowable or not and a first edge image composed of edge components of the image of the paper document, in association with identification information assigned to the paper document;

image-processing an image read from the paper document;

reading an image of the paper document containing the identification information in response to an action to process the paper document assigned with the identification information;

extracting the identification information from the read image of the paper document;

acquiring the protecting information and the first edge image corresponding to the extracted identification information;

determining whether the action to process the paper document is allowable or not based on the acquired protecting information;

calculating, based on a differential image between a second edge image composed of edge components of the image of the read paper document and the acquired first edge image, a number of pixels in a defective part of the second edge image relative to the first edge image, and determining whether the paper document is spoofed or not based on whether or not the calculated number of pixels exceeds a threshold value having been set previously in association with the action to process the paper document;

determining that a processing in response to the action to process the paper document is allowable when it is determined that the action to process the paper document is allowable and it is determined that the paper document is not spoofed; and performing a processing corresponding to the action to process the image read from the paper document if it is determined that the processing is allowable.

8. A non-transitory computer readable recording medium which stores a program for causing a computer to execute a process for image processing, the process comprising:

managing protecting information prescribing whether processing of a paper document is allowable or not and a first edge image composed of edge components of the image of the paper document, in association with identification information assigned to the paper document;

image-processing an image read from the paper document;

reading an image of the paper document containing the identification information in response to an action to process the paper document assigned with the identification information;

extracting the identification information from the image of the read paper document;

acquiring the protecting information and the first edge image corresponding to the extracted identification information;

determining whether the action to process the paper document is allowable or not based on the acquired protecting information;

calculating, based on a differential image between a second edge image composed of edge components of the image of the read paper document and the acquired first edge image, a number of pixels in a defective part of the second edge image relative to the first edge image, and determining whether the paper document is spoofed or not based on whether or not the calculated number of pixels exceeds a threshold value having been set previously in association with the action to process the paper document;

determining that a processing in response to the action to process the paper document is allowable when it is determined that the action to process the paper document is allowable and it is determined that the paper document is not spoofed; and performing a processing corresponding to the action to process the image read from the paper document if it is determined that the processing is allowable.

9. The image processing apparatus according to claim 1, wherein the second determination unit performs weighting so that a value per defective pixel is made different in accordance with whether the defective part of the second edge image is in a character portion or in a picture portion of the image of the paper document, and determines whether the paper document is spoofed or not based on whether a value corresponding to the number of pixels in the defective portion to which the weighted value is added exceeds the threshold value or not.

* * * * *